INVENTOR
KARL F. KIRCHNER
BY Truman L. Styner
ATTORNEY

Sept. 2, 1952 K. F. KIRCHNER 2,609,491
RESONANT CIRCUITS
Filed Jan. 21, 1948 3 Sheets-Sheet 2

INVENTOR
KARL F. KIRCHNER
BY
Truman L. Styner
ATTORNEY

Sept. 2, 1952 K. F. KIRCHNER 2,609,491
RESONANT CIRCUITS
Filed Jan. 21, 1948 3 Sheets-Sheet 3

INVENTOR
KARL F. KIRCHNER
BY
ATTORNEY

UNITED STATES PATENT OFFICE 2,609,491

RESONANT CIRCUITS

Karl F. Kirchner, Bloomfield, N. J.

Application January 21, 1948, Serial No. 3,467

1 Claim. (Cl. 250—20)

My invention relates to resonant circuits and is particularly directed to tunable circuits operable at intermediate, radio, and high or ultrahigh frequencies.

It is well-known that the frequency of resonance of a circuit containing inductance and capacity is not a linear function of the capacity or inductance in the circuit and that tuning dial graduations are not even throughout the tuning range. To relieve crowding at the high frequency end of a band of frequencies, irregularly shaped tuning condensers are commonly used so that the per unit change in capacity for each unit of condenser rotation becomes less as the high frequency end of the band is approached. Again, in permeability tuners, having lengthwise adjustable magnetic plungers in a hollow cylindrical coil, the coil windings are often non-uniform in pitch.

Variable pitch windings are not only expensive to manufacture but are difficult to standardize as to electrical characteristics. For superheterodyne receivers, where a radio frequency and an oscillator must track for a constant intermediate frequency, it is particularly difficult to arrange the pitch so that all frequencies in a given band will be converted to the fixed intermediate frequency. Tracking problems in a superheterodyne receiver are further aggravated by the fact that the range and percentage change of frequency per degree change in dial position is different for the radio frequency and for the intermediate frequency circuits. For example, if the band to be received extends from 500 to 1500 kilocycles and the desired intermediate frequency is 400, the local oscillator must be variable from 900 to 1900 kilocycles, so that the R. F. tuning range is three to one while the oscillator range is approximately two to one. Yet, the frequency changing elements of the oscillator and of the radio frequency circuit must be "ganged" for one-dial tuning and for mechanical reasons the displacement of the elements, whether they be condensers or plungers, must be the same. To reduce the range of one tuner with respect to the other, trimming and/or padding condensers or coils are connected into the tank circuit of the R. F. tuner. With these trimmers and padders the displacement-frequency response of the tuner is made even more complex. It is generally accepted in practice that if the oscillator and R. F. can be made to track at either end of the band and at the center, the receiver performs well enough for most uses.

In the conventional I. F. transformers used in radio receivers a considerable part of the magnetic flux is in the surrounding air. This requires the use of shields to prevent interaction with other parts of the circuit. Further, since the shield must be spaced from the coil in order to prevent excessive losses, the I. F. assemblies cannot be made in small sizes.

The principal object of my invention is a resonant circuit which has an easily predetermined frequency characteristic.

Another object of my invention is a combination of resonant circuits adapted for different frequency ranges which may easily be made to precisely track over any desired frequency band.

Another object of my invention is to make an I. F. transformer of much smaller size than heretofore has been made, and still give the performance characteristics of one of conventional dimensions. The relatively large size of the I. F. transformer with respect to other parts has been a major limitation upon the smallness of a pocket-size radio receiver.

My invention is defined with particularity in the appended claim and preferred embodiments thereof are described in the following specification and are shown in the accompanying drawing in which Figure 1 is an elevational view of a tuning element of my invention;

According to my invention the many difficulties of tuners and their tracking problems are obviated by novel circuits to be hereinafter fully described.

My novel circuit comprises connected capacitive and inductance reactances to form a resonant circuit of either the series or parallel type, the inductive reactance comprising two or more windings on a substantially closed magnetic core of high permeability. The core comprises two relatively movable members, each with spaced pole faces, the pole faces of the members being shiftable to selectively interchange the positions of the pole faces and hence vary the proportions of aiding and bucking flux of the two windings and hence vary the coupling between, or the mutual inductance between the two windings. The core material preferably consists of fine particles of iron or its compounds or other magnetic material compressed into a hard coherent body, the particles being spaced by non-magnetic binding material yet close enough to effect a substantially closed magnetic circuit between the particles. The smallness of the particles seems to contribute to lower eddy and hysterisis losses with surprisingly high permeability factors. The properties of the cores are more fully described in my copending application entitled Inductance Devices, Serial No. 789,483, filed December 3, 1947.

Figure 1:
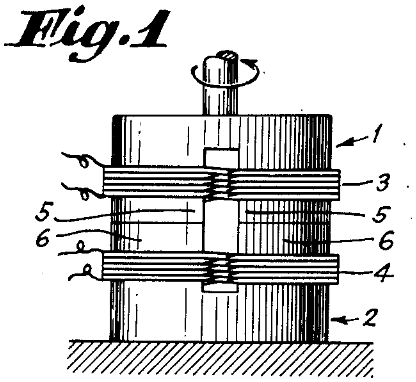

The inductance device shown in Figure 1 comprises a core structure of two members 1 and 2, each member being generally horseshoe or U-shaped and each having two flattened pole faces at the ends of the legs 5 and 6. The two pairs of pole faces are relatively movable so that the polarity of one pair of poles may be selectively changed from an in-phase to a 180° out-of-phase position with respect to the other pair of poles without change in reluctance of the magnetic circuit constituted by the two core members.

Figure 8:
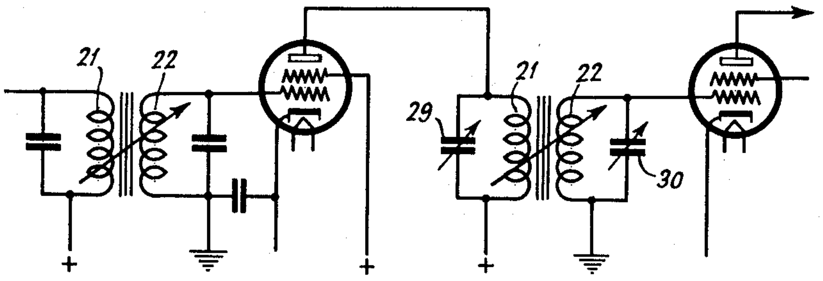
Figure 8 is a circuit diagram of a conventional cascaded amplifier employing my invention.

Wound upon the two legs of the core members are figure-8-windings or coils 3 and 4, respectively, at least one of the coils having two flexible or pigtail leads to provide freedom of movement of its core with respect to the other. If the two coils are connected in series, and hence in series or in parallel with a condenser, a resonant circuit results, the frequency of which is determined by the condenser and by the self-inductance of the two coils as well as by the mutual inductance between the two coils. Since the reluctance of the magnetic circuit remains substantially constant in any rotational position of the core member, the self-inductances of the two coils remain substantially constant while the effective mutual inductance may be varied from near zero to a maximum. The range of mutual inductance variation as pointed out in my copending application, supra, may be numerically equal to four times the value of the self-inductance of one coil. It will more fully hereinafter appear that this constant self-inductance, while the resonant frequency of the circuit is varied, has many advantages.

Where simultaneous variations of a number of tuned circuits are desired as in cascaded amplifier stages or in the R. F. and oscillator stages of a superheterodyne receiver, two or more coil-core assemblies may be mechanically united as suggested in Figure 3. Two inductance devices are shown, the core members 1, 2, 1*a* and 2*a* being axially aligned and joined end-to-end, the two inner core members 1 and 1*a* being formed integrally or separately and joined mechanically as by an adhesive. A friction roller 7 and a shaft 8 are employed to drive the two inner core members 1 and 1*a*. Any desired roller size may be used for the necessary vernier action. The two pairs of coils are connected, respectively, in separate resonant circuits in the particular applications hereinafter described.

Figure 4:
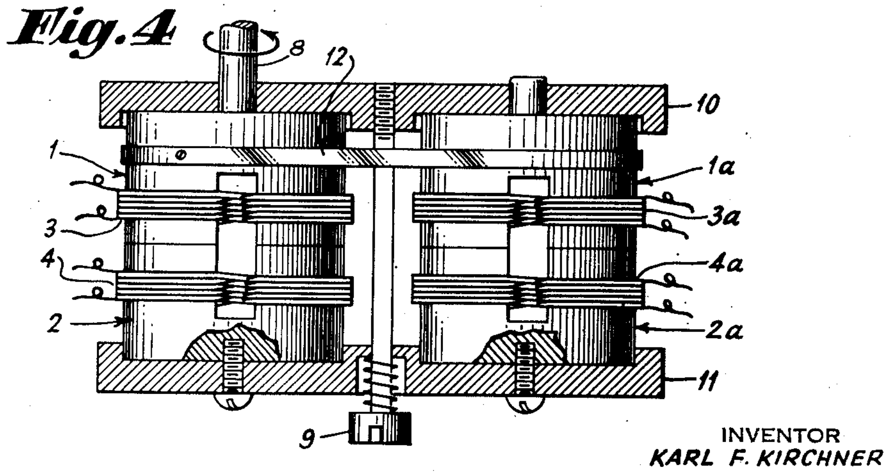
Figure 4 is an elevational view of another "ganged" tuner of my invention.

Alternatively, the inductance devices may be placed side-by-side as suggested in Figure 4. The two core members 2 and 2*a* are fixed to the end plate 11 while the two complementary core members 1 and 1*a* are rotatably mounted in the end plate 10, the two plates being aligned and held in parallel spaced relation by the screw 9. A spring is preferably placed under the screw head to exert a yielding pressure between the pole faces of the core members. The two movable core members are mechanically interlinked by the flexible steel belt 12, preferably fixed with a rivet or pin to each core member to prevent slippage. The tuning dial on shaft 8 will thus simultaneously and equally rotate cores 1 and 1*a*.

Figure 3:
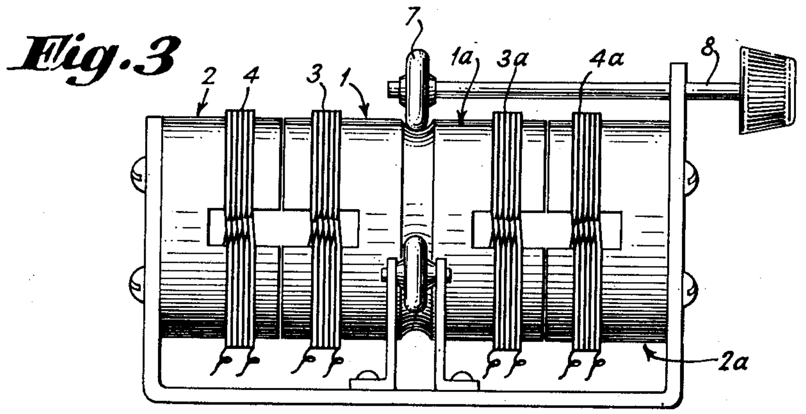
Figure 3 is an elevational view of two "ganged" tuning elements of my invention.

One advantage of multi-element tuner of Figures 3 or 4 is the extremely small size of the unit. For a given inductance and frequency, the size of the assemblies described is but a small fraction of the size of the conventional condenser or plunger type tuner. Further, with the high permeable core, there are few stray magnetic lines so the core-coil assemblies of different circuits may be closely spaced without troublesome interaction. It will be obvious to those skilled in the art that three or more pairs of core-coil assemblies may be employed in the arrangements of Figures 3 or 4.

Figures 5, 6:
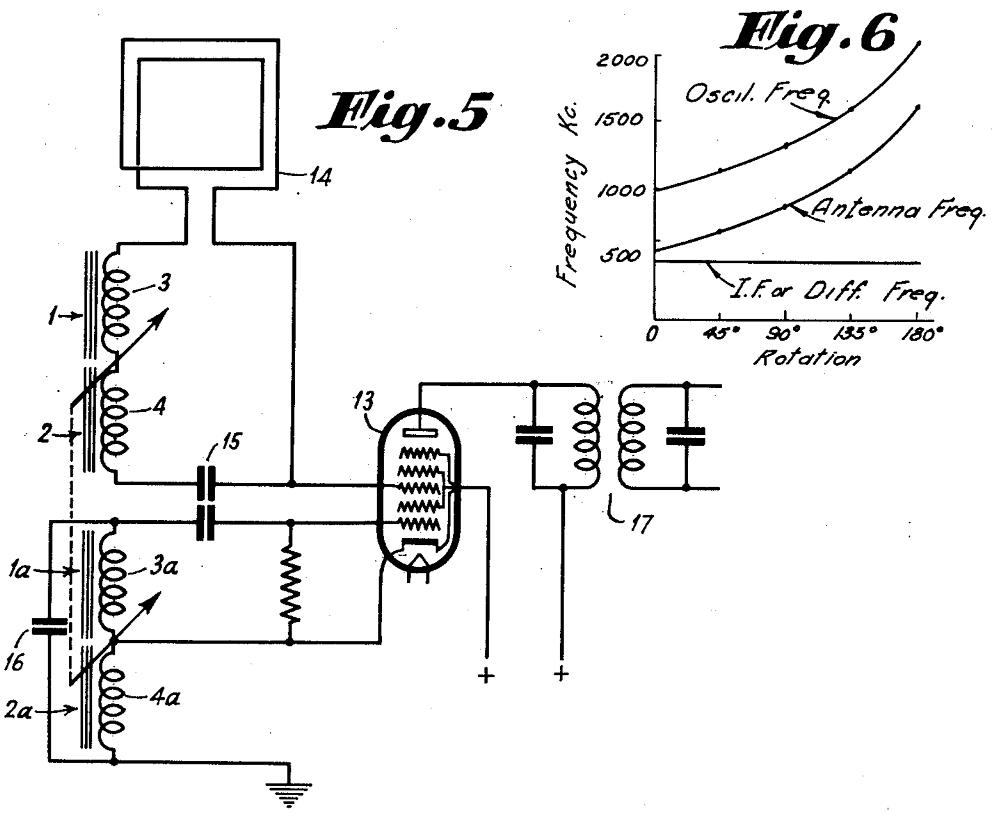
Figure 5 is a circuit diagram of one superheterodyne receiver employing my novel tuner.
Figure 6 is a graph of the frequency characteristics of resonant circuits of my invention.

In Figure 5 is shown one circuit application of my novel tuner, this circuit comprising a radio receiver of the superheterodyne type in which the antenna feeds directly to the input of a frequency converter tube 13 without the benefit of a radio frequency amplifier. Connected in the antenna circuit, shown here as a loop 14, are the inductances 3 and 4 of my novel inductance device, the combined inductance of the loop and of the coils being paralleled with the fixed condenser 15. In the oscillator section of the converter tube is connected a second inductance device, the coils 3*a* and 4*a* of which are connected in series and across the fixed condenser 16. The frequency determining elements may be connected Hartley-fashion, as shown, or in any desired manner for establishing the necessary grid-plate phase relations for oscillations. Indeed, the oscillator may comprise a separate tube, if desired. Further, feedback may be effected by a second coil, not shown, wound on one of the core members 1*a* or 2*a* in the oscillator and connected in an output circuit of the oscillator tube. The windings 3*a* and 4*a* in the oscillator circuit should be unequal in number of turns to prevent zero inductance and stoppage of oscillations. The screen grids and the suppressor grid are here connected as usual, the output circuit being coupled through the intermediate frequency transformer 17 to a second amplifier or to a detector stage. If the band to be received is the broadcast band from 550 to 1600 kilocycles and if the intermediate frequency is, say, 455 kilocycles, the oscillator resonant circuit preferably extends from 1000 to 2055 kilocycles. The loop antenna may, of course, be inductively coupled to the R. F. tuner or may be connected in parallel with all or part of the tuning coils.

The two tuners are mechanically linked, as in Figure 3 or 4, so that the one dial is sufficient to tune the receiver to the desired incoming signal. As the dial is varied only the mutual inductances between the coils 3 and 4 or between the coils 3*a* and 4*a* are varied, the self-inductances of the coils remaining substantially constant.

Figure 2:
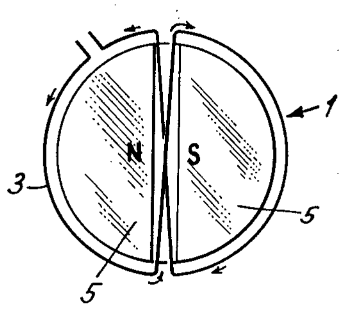
Figure 2 is an end view of a magnetic core and coil of Figure 1.

Referring again to Figures 1 and 2, it will be perceived that the mutual inductance or degree of coupling between the two coils is proportional to the angular displacement of one core on the other. Since there must be space between the poles to receive the windings, the pole faces are not geometric semi-circles, and hence, for the structures shown, the face-to-face change in pole area as core 1 rotates will not produce an exact linear change in inductance. If, however, the gap between the pole faces of each core member is reduced to substantially zero so that the width of the gap is negligible compared to the diameter of the core member and so that the pole faces are geometric semi-circles, exact linear change in inductance is produced.

It will also be perceived that with similar relationship between frequency and dial position for both the antenna and oscillator tuner, tracking between the R. F. and oscillator circuits becomes quite simple. It is now but a matter of making the slopes of the curves of frequency vs. rotation similar to obtain precise matching of frequencies throughout the band. Heretofore, tracking at three points in the band was the best that could be obtained. In my device, the slope of the frequency-rotation characteristic may be pre-selected by design of the magnetic circuit to obtain required reluctance and mutual inductance. Core material, cross sections, and air gaps between core members effect reluctance. The geometric shape of the pole faces may also determine the curve slope.

Fig. 6 shows by graphs the frequency-rotation characteristics, of the antenna and oscillator circuits of Fig. 5, the frequency values shown being obtained by measurements in the broadcast band. The difference between the resonant frequency of the antenna circuit and the oscillator circuit was found to be the same for all angular positions of the adjustable cores and the resulting intermediate frequency remained constant as shown. If there should occur in manufacture slight differences in the overall slopes of the characteristics of the two circuits, as when the cores or coils are slightly mismatched, the slope of one may be decreased slightly with respect to the other by introducing a short air gap in the core of said one circuit. For example, a thin non-magnetic shim between the sliding pole faces would serve the purpose.

Figure 7:
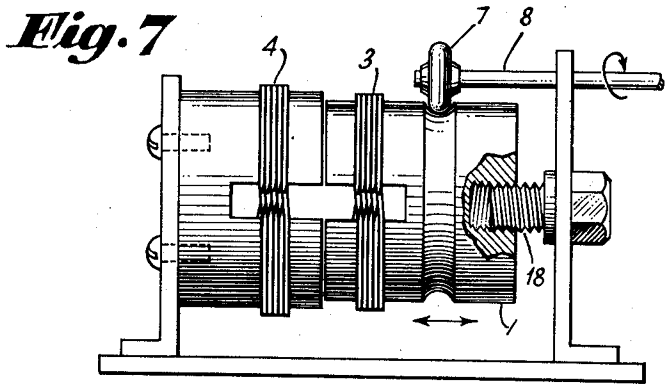
Figure 7 shows still another tuner of my invention.

Alternatively, the slope of the frequency-rotation characteristic may be changed by causing the air gap to vary with rotation. If one coil member is made to travel axially with respect to the complementary core member, to increase progressively the air gap, as the core member is rotated, extreme changes of mutual inductance may be made. This may be effected conveniently, as shown in Figure 7, by mounting the rotatable core member 1 on a lead screw 18 which will draw the core members 1 and 2 apart during rotation. Of course, the position of the frequency-rotation characteristic may be shifted slightly without a change in slope by rotating the core member of one circuit with respect to the core member of the other circuit.

My "ganged" tuners may be adapted with equal facility to operate circuits to be tuned to the same frequency as in multistage R. F. or I. F. amplifiers. In Figure 8, for example, a conventional two-stage amplifier is shown, each stage being coupled with my novel inductance device connected as a transformer. The amplifier may be designed for intermediate or radio frequencies. The condensers 29 and 30, connected across the primary and/or secondary winding 21 and 22 of each transformer, are selected to cause the transformer windings to resonate at the desired frequency and are preferably made at least slightly adjustable for trimming and aligning purposes. The inherent distributed capacities in the windings 21 and 22 may in many cases be sufficient to tune the windings. Where the turns are close-spaced as here, the capacities are usually adequate for resonance at intermediate frequencies. Adjustability of the core members here serves the highly useful function of controlling the band width passed by the transformers. As the mutual inductance varies, the relation of effective inductance and resistance of the windings change and the "Q" of the circuits vary. Hence, the effective band pass is variable. Such a variable band pass is convenient in adjusting for the optimum band width under various radio receiving conditions.

Figure 9:
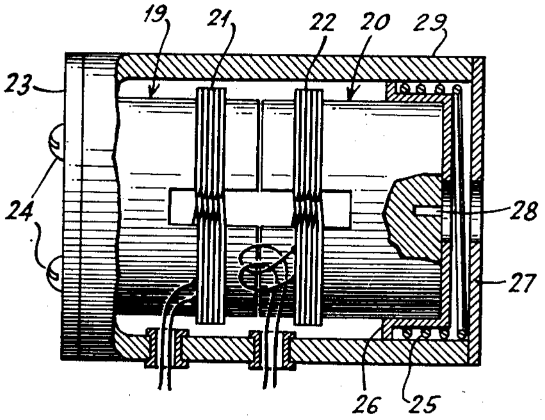
Figure 9 is a view of an adjustable coupling device, partly in section, according to my invention.

Figure 9 suggests one structural assembly for my novel I. F. coupling coil, the two coils 21 and 22 and cores 19 and 20 are aligned in the metal sleeve 29 which is closed at one end with a plate 23, screws 24 through the plate fixing the one core 19. The faces of the other core 20 are spring pressed against the first with the spring 25 held between the collar 26 and the end washer 27. A screw driver kerf 28 in the core member 20 is provided for rotary adjustment of the one core.

One of the outstanding characteristics of my novel tuner and coupler is its small size. Because of the high permeability of the closed magnetic circuit, substantially all of the flux or electromagnetic lines of forces are confined to the core and hence interlink, with negligible effect, with surrounding apparatus. Unlike the conventional R. F. transformer tunable by an adjustable plunger, no large shielding cans are required. Closely spaced metal parts cause no noticeable losses in the circuits and precise control of the inductance values is always retained. One receiver of pocket-size found to be highly sensitive and selective contained intermediate frequency transformers made of powdered iron cores of the type commonly known as "General Aniline P-128." The core members were each ⅜" in diameter, ⅜" long and had a groove $\frac{1}{16}$" wide diagonally across one end of the core, ⅛" deep. The wire consisted of six strands of No. 44 "Litz" wire covered with a single layer of nylon. Sixty-nine turns on each leg were used and with 1000 mmf. capacity across the two windings connected in series, a resonant frequency of 455 kilocycles was obtained.

The uses of the variable inductance device of my invention in innumerable combinations in radio circuits will now become apparent to those skilled in the art. My inductance device, for example, may be employed as the impedance element in so-called impedance coupled amplifiers, the windings 3 and 4 being connected in series between the plate and B-voltage source in the usual way. Adjustment of the load impedance is made by rotation of one core as disclosed. The impedance may be tuned with a condenser, of course.

My novel tuner is small in size, provides uniformly adjustable frequency values over a wide range, is self-shielded and is inexpensive to manufacture. The need for trimmers can also be avoided.

I claim:

A carrier wave receiver comprising a frequency mixing stage, a carrier wave circuit, and a local oscillator circuit connected to said stage, each of said circuits comprising two windings, a plurality of magnetic core members, each winding being on a separate core member, the core members each having close-spaced side-by-side coplanar semicircular pole faces, the pole faces of one core member of each circuit being substantially concentric with and overlaid with the pole faces of its complementary core member, the core members being relatively rotatable on an axis perpendicular to and through the substantially common centers of said pole faces to selectively linearly vary the mutual inductance between windings with a constant predetermined magnetic reluctance, and one core member of one of said circuits being mechanically connected with one core member of the other of said circuits.

KARL F. KIRCHNER.

REFERENCES CITED

The following references are of record in the file of this patent:

UNITED STATES PATENTS

| Number | Name | Date |
|---|---|---|
| 1,501,649 | Cummings | July 15, 1924 |
| 1,641,925 | Gabriel | Sept. 6, 1927 |
| 1,925,224 | Alder | Sept. 5, 1933 |
| 2,028,534 | Crossley | Jan. 21, 1936 |
| 2,042,020 | Roe | May 26, 1936 |
| 2,053,077 | Harrison | Sept. 1, 1936 |
| 2,190,048 | Sinninger | Feb. 13, 1940 |
| 2,263,613 | Conron | Nov. 25, 1941 |
| 2,288,856 | Stocker | July 7, 1942 |
| 2,463,170 | Grignon et al. | Mar. 1, 1949 |
| 2,509,425 | Fagen | May 30, 1950 |

OTHER REFERENCES

Radio Engineer's Handbook, by Terman, published 1943, pages 107 to 109.